UNITED STATES PATENT OFFICE.

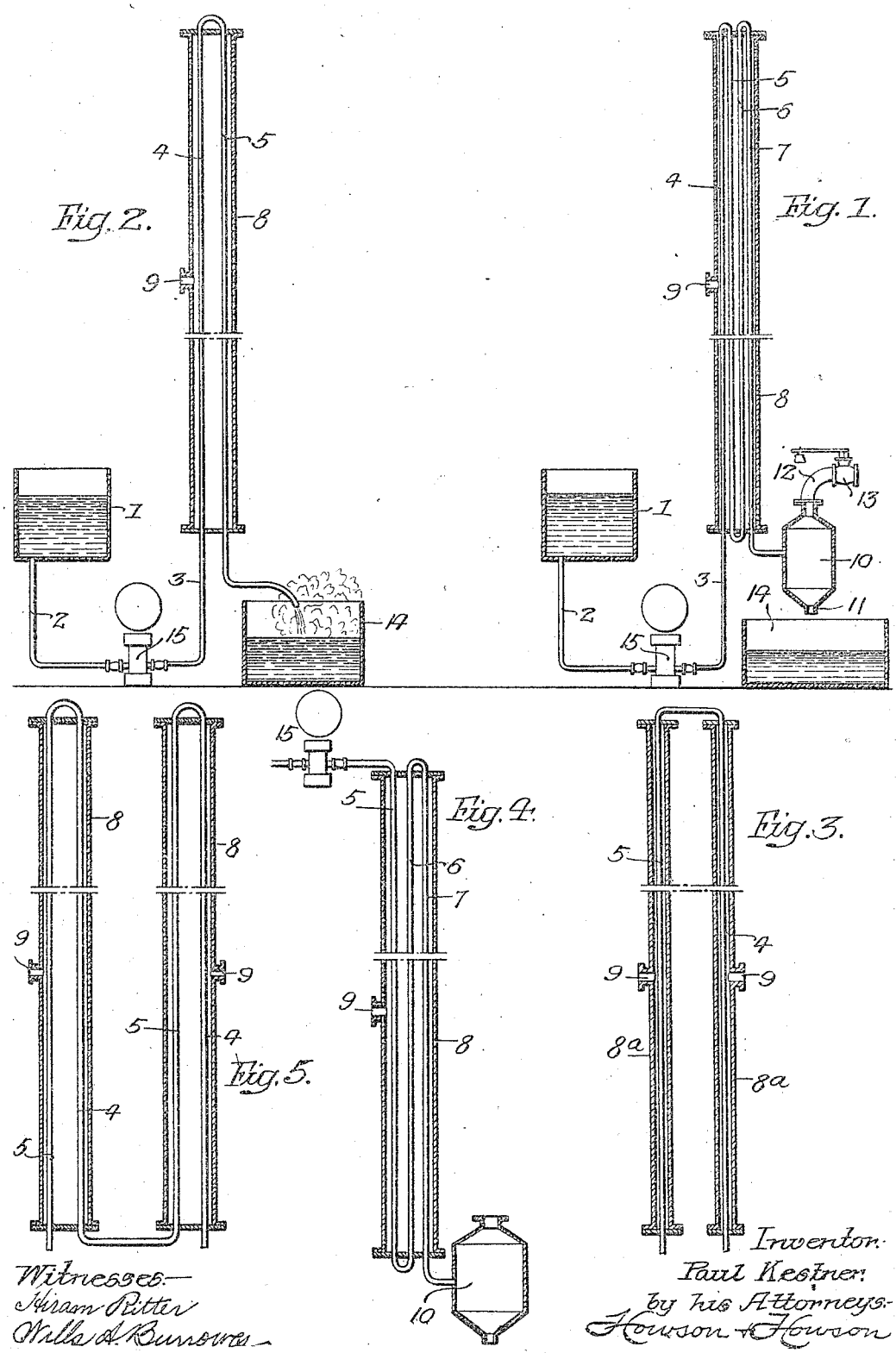

PAUL KESTNER, OF LILLE, FRANCE, ASSIGNOR TO KESTNER EVAPORATOR COMPANY, OF PHILADELPHIA, PENNSYLVANIA, A CORPORATION OF PENNSYLVANIA.

APPARATUS FOR CONCENTRATING LIQUIDS TO HIGH DENSITIES.

1,090,628.  Specification of Letters Patent.  Patented Mar. 17, 1914.

Original application filed June 20, 1910, Serial No. 567,956. Divided and this application filed June 23, 1911. Serial No. 634,910.

*To all whom it may concern:*

Be it known that I, PAUL KESTNER, a citizen of the Republic of France, and a resident of Lille, Department Nord, France, have invented certain Improvements in Apparatus for Concentrating Liquids to High Densities, of which the following is a specification.

This invention relates to that class of evaporating apparatus in which the liquid treated passes through the evaporator in the form of a film and in which the operation is continuous.

One object of the invention is to provide a novel form of apparatus particularly designed for carrying out the process described and claimed in my application for Patent No. 567,956, filed June 20, 1910; it being especially desired that the apparatus shall be capable of successfully evaporating to a high density various vegetable and other extracts as well as viscous liquids or liquids containing sensitive colloid matters.

These objects and other advantageous ends I secure as hereinafter set forth, reference being had to the accompanying drawings, in which:—

Figure 1, is a vertical section to some extent diagrammatic illustrating one form of my evaporating apparatus; Fig. 2, is a vertical section illustrating a somewhat similar form of the apparatus shown in Fig. 1, and Figs. 3 to 5 inclusive are modifications of my invention.

Referring to Fig. 1, the liquid to be concentrated or evaporated is supplied from a tank or container 1 which is connected through pipes 2 and 3 to the first of a series of tubes 4, 5, 6, and 7. Said tubes are connected together in series, that is, the pipe 3 is connected to one end of the tube 4 whose opposite end is connected to the upper end of the tube 5. The tube 6 has its lower end connected to said tube 5 and its other end connected to the upper end of the tube 7 and all of said tubes are inclosed within a casing or heating jacket 8 supplied with heating fluid, such as steam through a suitable inlet 9, there being, if desired, an outlet (not shown) for carrying off the water condensing in the casing. The lower end of the tube 7 in this instance is connected to a separator 10 having a bottom outlet 11 for concentrated liquid, and a conduit 12 leading from its upper portion and including a back pressure valve 13. A tank or other suitable receptacle 14 is mounted to receive the concentrated liquid from the outlet 11.

A pump 15 is preferably connected to receive liquid from the pipe 2 and to deliver it into the pipe 3, since under operating conditions there is usually pressure in the tubes 4, 5, 6 and 7. When steam is supplied to the casing 8 through the inlet 9, the liquid which is fed into the pipe 4 by the pump 15 is caused to rise in film form and is shortly distributed over the interior wall of the evaporating tube in accordance with the well recognized principle of the climbing film. Under these conditions the vapor from the liquid travels as a central core through the tube and carries with it the liquid film on the walls thereof and as said liquid passes into the tubes 5, 6 and 7, said film becomes thinner and the volume of vapor becomes greater, with the result that its velocity is very materially increased, so that the liquid film is exposed to the high temperature of the tubes for but a relatively short time before it is discharged into the separator 10.

It is, of course, obvious that the lengths of the evaporating tubes as well as their number may be varied to suit the various liquids which it is desired to evaporate or concentrate, although I have found it advisable to always so arrange the tubes that the liquid flows downwardly from the last one through which it passes; the object of this arrangement being to secure the aid of gravity in causing the highly concentrated and relatively dense viscous fluid to flow.

Fig. 2, represents a relatively simple form of the apparatus in which the casing 8 contains but a single pair of tubes 4 and 5, the latter of these being so connected that the fluid flows downwardly through it in its final stage of evaporation and is discharged into a receiving tank 14.

As shown in Fig. 3, each of the various evaporating tubes may have its own heating casing 8ª so that the tube 4, for example, may be heated to a temperature different from that to which the tube 5 is raised; it being only necessary that the steam or other heating agent be supplied at different temperatures to said casings.

In the case of Fig. 4, the apparatus illustrated is so designed as to receive at the top of a tube 5 the liquid to be treated; there being in the casing two other tubes 6 and 7 the latter of which is connected to a separator 10 similar to that shown in Fig. 1.

According to the construction shown in Fig. 6, each pair of up and down tubes 4 and 5 is contained within a single casing 8; the lower end of the tube 5 of one casing being connected to the lower end of the tube 4 of the other. In every instance, however, the casings with their various tubes are arranged vertically and the tubes are usually connected, preferably, though not necessarily, outside of their heating casings so as to provide a continuous conduit in which the liquid to be treated may be evaporated or concentrated to the desired point in a single passage through the apparatus; there being preferably three or more vertical tubes connected in series as described and some means for feeding the liquid to be evaporated against the pressure generated within the apparatus. As noted the last tube through which the liquid passes permits a downward flow of the same.

I claim:—

An evaporating apparatus consisting of a plurality of more than two vertical tubes connected in series; means for supplying liquid to be evaporated to one end of said series of tubes; heating means for the tubes; with a separator connected to the lower end of the last tube of the series; said separator being provided with an outlet for liquid and a vapor outlet having a back pressure valve.

In testimony whereof, I have signed my name to this specification, in the presence of two subscribing witnesses.

PAUL KESTNER.

Witnesses:
  HENRI CHARRIER,
  LÉON PECKEL.